(12) United States Patent
Michioka et al.

(10) Patent No.: US 8,251,587 B2
(45) Date of Patent: Aug. 28, 2012

(54) MOTION GUIDE DEVICE, RELATIVE MOTION SYSTEM AND DISPLACEMENT ABSORBING MECHANISM

(75) Inventors: Hidekazu Michioka, Tokyo (JP); Hiroaki Mochizuki, Tokyo (JP)

(73) Assignee: THK Co., Ltd., Tokyo (JP)

( * ) Notice: Subject to any disclaimer, the term of this patent is extended or adjusted under 35 U.S.C. 154(b) by 874 days.

(21) Appl. No.: 12/092,781

(22) PCT Filed: Nov. 7, 2006

(86) PCT No.: PCT/JP2006/322194
§ 371 (c)(1),
(2), (4) Date: Jan. 8, 2009

(87) PCT Pub. No.: WO2007/055208
PCT Pub. Date: May 18, 2007

(65) Prior Publication Data
US 2009/0154850 A1    Jun. 18, 2009

(30) Foreign Application Priority Data
Nov. 8, 2005  (JP) ................. 2005-323526

(51) Int. Cl.
*F16C 19/00* (2006.01)
*F16C 29/06* (2006.01)
*F16C 41/00* (2006.01)

(52) U.S. Cl. ................ 384/36; 384/45; 384/57

(58) Field of Classification Search ........... 384/7, 36, 384/45, 54, 57, 624; 267/136, 137, 140.2, 267/140.4, 140.5, 141.1, 141.2, 151, 152; 248/548, 560, 562, 573
See application file for complete search history.

(56) References Cited

U.S. PATENT DOCUMENTS

| | | | |
|---|---|---|---|
| 5,042,783 A * | 8/1991 | Ciolczyk et al. | 267/81 |
| 5,292,211 A * | 3/1994 | Takei | 408/91 |
| 5,578,913 A | 11/1996 | Yasuda et al. | |
| 6,402,381 B1 * | 6/2002 | Shirai et al. | 384/45 |

FOREIGN PATENT DOCUMENTS

| | | |
|---|---|---|
| JP | 5-288215 A | 11/1993 |
| JP | 7-190053 A | 7/1995 |
| JP | 2001-30128 A | 2/2001 |
| JP | 2001-99151 A | 4/2001 |
| JP | 2004-307593 A | 11/2004 |
| JP | 2005-113488 A | 4/2005 |
| JP | 2005-188546 A | 7/2005 |

OTHER PUBLICATIONS

International Search Report of PCT/JP2006/322194, date of mailing Feb. 6, 2007. Notification of Transmittal of Translation of the International Preliminary Report on Patentability of International Application No. PCT/JP2006/322194 dated Sep. 9, 2008 with Forms PCT/IB/373 and PCT/ISA/237.

* cited by examiner

*Primary Examiner* — Thomas R Hannon
*Assistant Examiner* — Phillip A Johnson
(74) *Attorney, Agent, or Firm* — Westerman, Hattori, Daniels & Adrian, LLP

(57) ABSTRACT

Provided is a motion guide device having a low rigidity in the vertical direction and a low rigidity in the horizontal direction.
The motion guide device has: a raceway rail 15 having a bottom surface 30a, side surfaces 30b and an upper surface 30c and being mounted on one of a base 12 and a moving body 11; and a moving block 16 having a center portion 16a facing the upper surface 30c of the raceway rail 15 and side wall portions 16b facing the side surfaces 30b of the raceway rail 15 and being mounted linearly or curvilinearly movable relative to the raceway rail 15. On a side surface of the moving block 16, a displacement absorbing mechanism 17, 38 is provided. The displacement absorbing mechanism 17, 38 has a mounting member 26, 34 mounted on an opposite one of the base 12 and the moving body 11, and a displacement absorbing portion 31, 37 which is fixed to the mounting member 26, 34 and which is shear-deformed when the mounting member 26, 34 is displaced in a direction crossing an upper surface of the moving block 16.

11 Claims, 13 Drawing Sheets

Cross sectional view
taken along line II-II

Detailed view of V part

MOTION GUIDE DEVICE, RELATIVE MOTION SYSTEM AND DISPLACEMENT ABSORBING MECHANISM

TECHNICAL FIELD

The present invention relates to a motion guide device for guiding linear or curvilinear motion of a moving body relative to a base, a relative motion system equipped with such a motion guide device and a displacement absorbing mechanism provided in the motion guide device.

BACKGROUND ART

A motion guide device is a mechanical element for guiding linear motion or curvilinear motion of a moving body relative to a base, and is built in various machines such as machine tools, semiconductor/liquid crystal manufacturing apparatuses, auto cars and robots.

FIG. 16 shows an example of such a motion guide device used as one-axis device. The motion guide device has an elongating raceway rail 1 and a moving block 2 mounted linearly and curvilinearly movable thereon. When the raceway rail 1 is mounted on a base 3 and the moving block 2 is a moving body 4 such as a table. Between the raceway rail 1 and the moving block 2, there is a plurality of rolling elements arranged rollably and the moving block 2 slides smoothly along on the raceway rail 1.

In some machines having motion guide devices built therein, the moving body 4 may be displaced slightly in the vertical direction or horizontal direction relative to the base 3 on FIG. 16. For example, for a machine used in adverse environments where wide temperature variations are encountered, if structural elements, such as the base 3 and the moving body 4, have different thermal expansion coefficients, the moving body 4 may be displaced relative to the base 3. Otherwise, if the base 3 is made of aluminum and the raceway rail 1 is made of steel, difference between their thermal expansion coefficients brings about bimetallic action thereby to change a curvature of the raceway rail 1.

When the moving body 4 is displaced in the vertical direction or the horizontal direction relative to the base 3 in a state where the motion guide device is tied between the moving body 4 and the base 3, displacement of the moving body 4 is applied as a load directly to the inside of the moving block. As rolling elements such as balls are arranged between the moving body 4 and the raceway rail 1, if displacement of the moving body 4 is small, such displacement is absorbed by deformation of the rolling elements. However, displacement of the moving body 4 is large, the rolling elements are largely deformed, and such deformation sometimes causes problems of short life duration of the rolling elements and difficulty in smooth rolling of the rolling elements. Hence, if such displacement of the moving body 4 is predictable, a large-size motion guide device is preferably selected, and rollers that can bear a large load are used as the rolling elements.

The applicant has proposed movable-member mounting plates capable of absorbing displacement in the vertical direction or the horizontal direction of the moving body 4 relative to the base 3 (see Patent document 1). As illustrated in FIG. 17, on the upper surface of the moving block, a radial direction plate 5 and a horizontal direction plate 6 are stacked as the movable-member mounting plates. These movable-member mounting plates 5 and 6 have thin portions 5a and 6a, respectively, which are elastically deformed to absorb displacement of the moving body 4 in the vertical direction or the horizontal direction relative to the base 3.

[Patent Document] Japanese Patent Laid-open Publication No. 7-190053

DISCLOSURE OF INVENTION

Problems to be Solved by the Invention

It is sure that the above-described movable-member mounting plates can absorb slight displacement of the moving body 4 due to mounting errors of the raceway rail 1 or the like. However, the flexibility of the thin portions 5a and 6a are limited and the above-described movable-member mounting plates are not suitable for absorption of a large displacement of the moving body 4 in a machine used in adverse environments where wide temperature variations are encountered.

Further, some machines require motion guide devices built therein to have a lower rigidity in the vertical direction and a higher rigidity in the horizontal direction. In other words, the moving body 4 is sometimes required to be displaced easily in the vertical direction and less easily in the horizontal direction relative to the base 3. However, such a requirement is difficult to satisfy because the moving body 4 is usually connected to the upper surface side of the moving block 2 and the upper surface side of the moving block 2 exhibits a high rigidity.

Then, the present invention has an object to provide a motion guide device, a relative motion system and an displacement absorbing mechanism having a low rigidity in the vertical direction and a high rigidity in the horizontal direction.

Means for Solving the Problem

The present invention will now be described below.

In order to solve the above-mentioned problems, the invention of an example 1 is a motion guide device for guiding linear or curvilinear motion of a moving body relative to a base, comprising: a raceway rail having a bottom surface, side surfaces and an upper surface and being mounted on one of the base and the moving body; a moving block having a center portion facing the upper surface of the raceway rail and side wall portions facing the side surfaces of the raceway rail and being mounted linearly or curvilinearly movable relative to the raceway rail; and a displacement absorbing mechanism provided on a side surface of the moving block, the displacement absorbing mechanism having a mounting member mounted on an opposite one of the base and the moving body, and a displacement absorbing portion which is fixed to the mounting member and which is shear-deformed when the mounting member is displaced in a direction crossing an upper surface of the moving block.

The invention of an example 2 is characterized in that, in a motion guide device of example 1, a space is provided over at least a part of the upper surface of the moving block in such a manner that the opposite one of the base and the moving body mounted onto the mounting member is apt to be displaced toward the upper surface of the moving block.

The invention of an example 3 is characterized in that, in a motion guide device of example 1 or 2, the displacement absorbing portion is formed by stacking a metal plate and a rubber layer.

The invention of an example 4 is characterized in that, in a motion guide device of any one of examples 1 to 3, the displacement absorbing portion has a rubber layer vulcanization-adhered to the side surface of the moving block.

The invention of an example 4 is characterized in that, in a motion guide device of any one of examples 1 to 4, the mounting member has a mounting-member side wall portion facing the side surface of the moving block and a mounting-member upper wall portion facing the upper surface of the moving block, and the mounting-member upper wall portion of the mounting member is provided with a mounting hole for mounting the mounting member onto the opposite one of the base and the moving body.

The invention of an example 6 is characterized in that, in a motion guide device of example 5, the displacement absorbing portion has a rubber layer interposed between the side surface of the moving block and the mounting-member side wall portion, and the rubber layer also extends to between the upper surface of the moving block and the mounting-member upper wall portion.

The invention of an example 7 is characterized in that, in a motion guide device of example 5 or 6, the mounting member is divided into two corresponding to the side wall portions horizontally in a pair of the moving block.

The invention of an example 8 is a motion guide device for guiding linear or curvilinear motion of a moving body relative to a base, comprising: a raceway rail having a bottom surface, side surfaces and an upper surface and being mounted on one of the base and the moving body; a moving block having a center portion facing the upper surface of the raceway rail and side wall portions facing the side surfaces of the raceway rail and being mounted linearly movable relative to the raceway rail; and a displacement absorbing mechanism provided between a side surface of the moving block and an opposite one of the base and the moving body, wherein a space is provided over at least a part of an upper surface of the moving block in such a manner that the opposite one of the base and the moving body mounted onto the mounting member is apt to be displaced toward the upper surface of the moving block.

The invention of an example 9 is a relative motion system having a base and a moving body linearly or curvilinearly movable relative to the base, comprising: the moving body having a wall surface; a base having a wall surface facing the wall surface of the moving body; a motion guide device, provided between the wall surface of the moving body and the wall surface of the base, for guiding linear or curvilinear motion of the moving body relative to the base; and a driving source for the linear or curvilinear motion of the moving body relative to the base, the motion guide device having a raceway rail having a bottom surface, side surfaces and an upper surface and being mounted on one of the base and the moving body; a moving block having a center portion facing the upper surface of the raceway rail and side wall portions facing the side surfaces of the raceway rail and being mounted linearly movable relative to the raceway rail; and a displacement absorbing mechanism provided on a side surface of the moving block, the displacement absorbing mechanism having a mounting member mounted on an opposite one of the base and the moving body, and a displacement absorbing portion which is fixed to the mounting member and which is shear-deformed when the mounting member is displaced in a direction crossing an upper surface of the moving block.

The invention of an example 10 is a displacement absorbing mechanism provided in a motion guide device having: a raceway rail having a bottom surface, side surfaces and an upper surface; and a moving block having a center portion facing the upper surface of the raceway rail and side wall portions facing the side surfaces of the raceway rail, the moving block being mounted on the raceway rail linearly or curvilinearly movable relative to the raceway rail, the displacement absorbing mechanism being provided to a side surface of the moving block, and having a mounting member with a mounting hole formed therein and a displacement absorbing portion which is fixed to the mounting member and which is shear-deformed when the mounting member is displaced in a direction crossing an upper surface of the moving block.

Effects of the Invention

According to the invention of example 1, when the moving body is displaced in the direction crossing the upper surface of the moving block relative to the base, the displacement absorbing mechanism provided on the side surface of the moving block is shear-deformed to absorb the displacement. Hence, the motion guide device obtains a lower rigidity in the vertical direction. Besides, as the displacement absorbing portion which is shear-deformed is arranged to the side surface of the moving block, a cross sectional area of the displacement absorbing portion is made larger and thereby the motion guide device obtains a higher rigidity in the horizontal direction.

According to the invention of example 2, it is possible to further reduce the rigidity in the vertical direction of the motion guide device.

According to the invention of example 3, it is possible to reduce the rigidity in the vertical direction of the displacement absorbing mechanism and enhance the rigidity in the horizontal direction.

According to the invention of example 4, as the rubber layer is vulcanization-adhered to the side surface of the moving block integrally, there is no need to fix the metal base plate to the side surface of the moving block. Hence, it becomes possible to reduce the horizontal width of the motion guide device.

According to the invention of example 5, as the mounting-member upper wall portion having the mounting hole provided therein is arranged into the upper surface side of the moving block, it is possible to reduce the horizontal width of the motion guide device.

According to the invention of example 6, the rigidity in the vertical direction of the motion guide device can be set smaller than the rigidity in the horizontal direction, and these rigidities are freely adjustable.

According to the invention of example 7, the rubber can be vulcanization-adhered to the side surface of the moving block.

According to the invention of example 8, as the space is provided on at least a part of the upper surface of the moving block, the base or the moving body is easily displaced in the vertical direction toward the moving block. Hence, the motion guide device can be given a low rigidity in the vertical direction.

According to the invention of example 9, when the moving body is displaced in the direction crossing the upper surface of the moving block relative to the base, the displacement absorbing mechanism provided on the side surface of the moving block is shear-deformed to absorb the displacement. Hence, the relative motion system obtains a lower rigidity in the vertical direction. Besides, as the displacement absorbing portion which is shear-deformed is arranged to the side surface of the moving block, a cross sectional area of the displacement absorbing portion is made larger and thereby the relative motion system obtains a higher rigidity in the horizontal direction.

According to the invention of example 10, when the moving body is displaced in the direction crossing the upper surface of the moving block relative to the base, the displacement absorbing mechanism provided on the side surface of the moving block is shear-deformed to absorb the displacement. Hence, as the displacement absorbing mechanism is provided in the motion guide device, the motion guide device obtains a lower rigidity in the vertical direction. Besides, as the displacement absorbing portion which is shear-deformed is arranged to the side surface of the moving block, a cross sectional area of the displacement absorbing portion is made larger and thereby the motion guide device obtains a higher rigidity in the horizontal direction.

BRIEF DESCRIPTION OF REFERENCES

Figure 1:
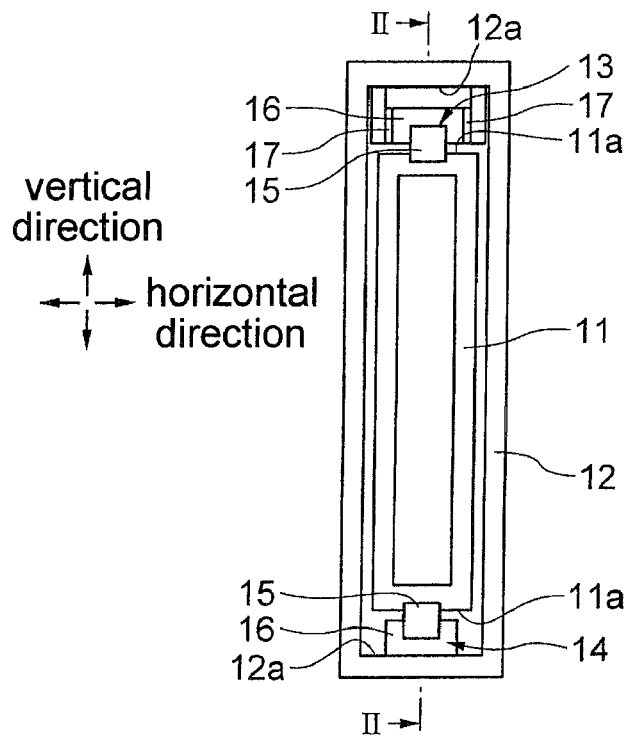
FIG. 1 is a plane view of a relative motion system equipped with a motion guide device according to a first embodiment of the present invention.

11 . . . moving body
11a . . . outer wall surface (wall surface)
12 . . . base
12a . . . inner wall surface (wall surface)
13, 14 . . . motion guide device
15 . . . raceway rail
16 . . . moving block
16a . . . center portion
16b . . . side wall portion
17, 38 . . . displacement absorbing mechanism
18 . . . ball (rolling element)
23 . . . side surface of moving block
24 . . . upper surface of moving block
26, 34 . . . mounting member
34a . . . mounting-member side wall portion
34b . . . mounting-member upper wall portion
27, 35 . . . rubber layer
28 . . . intermediate plate (metal plate)
30a . . . bottom surface of raceway rail
30b . . . side surface of raceway rail
30c . . . upper surface of raceway rail
31, 37 . . . displacement absorbing portion
36 . . . metal plate
39 . . . mounting hole

BEST MODES FOR CARRYING OUT THE INVENTION

Figure 2:
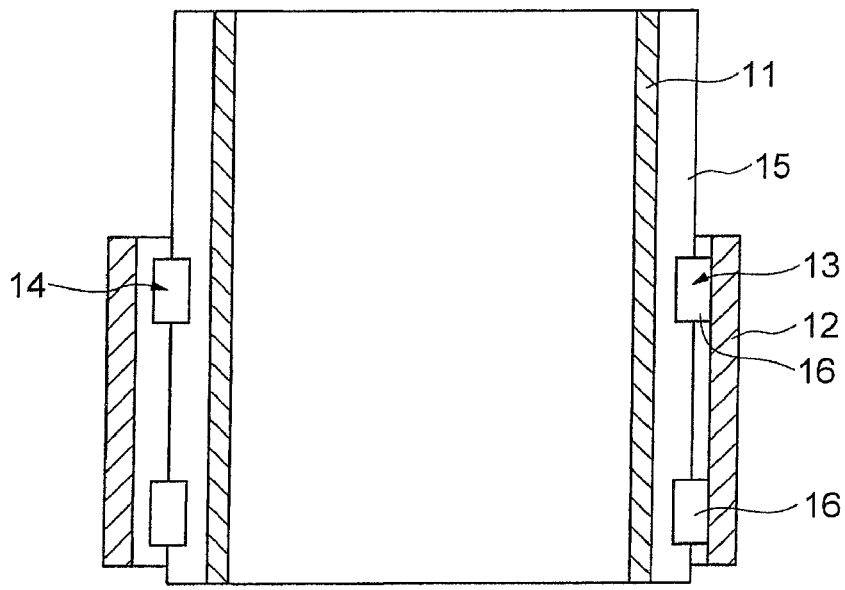
FIG. 2 is a cross sectional view taken along the line II-II on FIG. 1.

With reference to the attached drawings, a first embodiment of the present invention will now be described below. FIGS. 1 and 2 illustrate a relative motion system provided with a motion guide device according to the first embodiment of the present invention. FIG. 1 is a plane view of the relative motion system and FIG. 2 is a cross sectional view taken along the line II-II of FIG. 1. An elongating moving body 11 is covered with a frame-shaped base 12. The moving body 11 in the base 12 moves linearly along the base 12. Linear motion of the moving body 11 relative to the base 12 is guided by motion guide devices 13 and 14.

Figure 5:
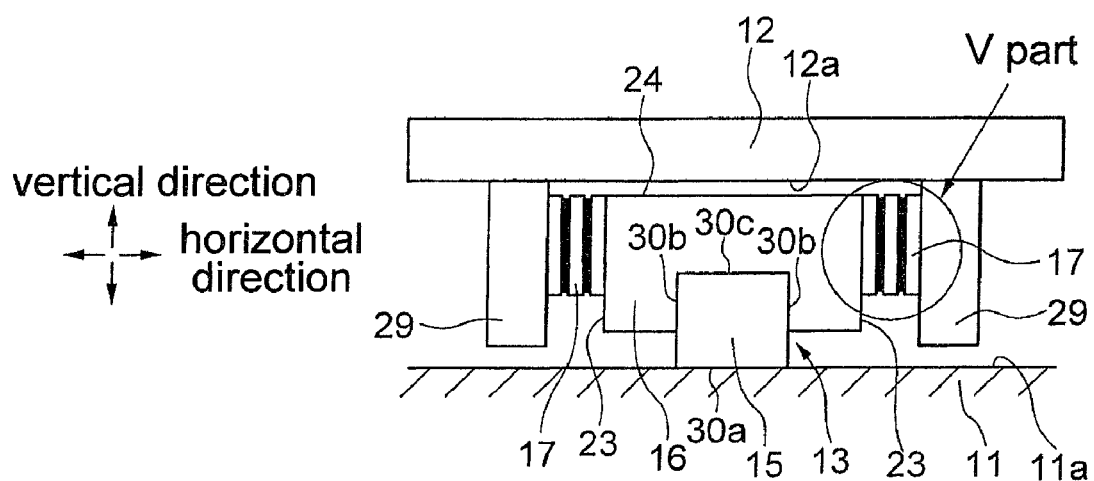
FIG. 5 is a front view of the motion guide device having displacement absorbing mechanisms mounted thereon.

Here in this embodiment, as illustrated in FIG. 5, the vertical and horizontal directions are defined based on the relative motion system that is arranged with the bottom surface 30a of the raceway rail 15 to the downside and the upper surface 30c to the upside. Although it is needless to say, the relative motion system may be arranged with the side surface 30b of the raceway rail 15 to the upper or lower side in actual use. Also in such arrangement, the vertical and horizontal directions are defined on the assumption that the relative motion system is arranged with the bottom surface 30a of the raceway rail 15 to the downside.

The moving body 11 is flat and has a fixed cross section. This moving body 11 has a pair of outerwall surfaces 11a parallel to each other. The frame-shaped base 12 surrounding the moving body 11 has a pair of inner wall surfaces 12a parallel to each other and facing the paired outer wall surfaces 11a of the moving body 11, respectively. Between the outer wall surfaces 11a of the moving body 11 and the respective inner wall surfaces 12a of the base 12, there is provided a pair of motion guide devices 13 and 14, respectively, for guiding linear movement of the moving body 11 relative to the base 12. In this embodiment, the raceway rails 15 of the motion guide devices 13 and 14 are mounted on the moving body 11 and moving blocks 16 are mounted on the fixed base 12. Besides, two moving blocks 16 are mounted on one raceway rail 15 (see FIG. 2). The moving body 11 is driven linearly by a driving source (not shown) such as a ball screw mechanism, a linear motor and a belt conveyer.

When the moving body 11 has a thermal expansion different from that of the base 12, the outer wall surfaces 11a of the moving body 11 are displaced relative to the respective inner wall surfaces 12a of the base 12, in the vertical direction in FIG. 1. If the motion guide device 13 is tied between the outer wall surface 11a of the moving body 11 and the inner wall surface 12a of the base 12, the motion guide device 13 has no way out, and displacement of the moving body 11 is applied as a load to the inside of the moving blocks 16. In view of this, in this embodiment, out of the motion guide devices 13 and 14, the moving blocks 16 of one motion guide device 13 are provided, at the side surfaces thereof, with displacement absorbing mechanisms 17 for absorbing displacement in the vertical direction of the moving body 11. These displacement absorbing mechanisms 17 are used to give the one motion guide device 13 way to move in the vertical direction in response to displacement in the vertical direction of the moving body 11. The other motion guide device 14 is not moved in the vertical direction.

Figure 3:
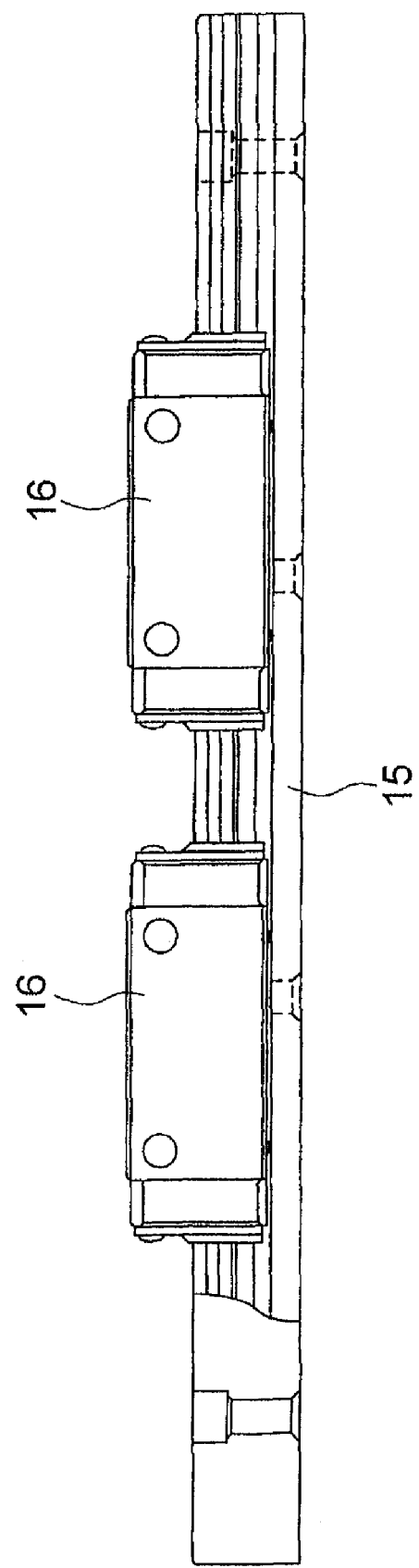
FIG. 3 is a side view of the motion guide device.
Figure 4:
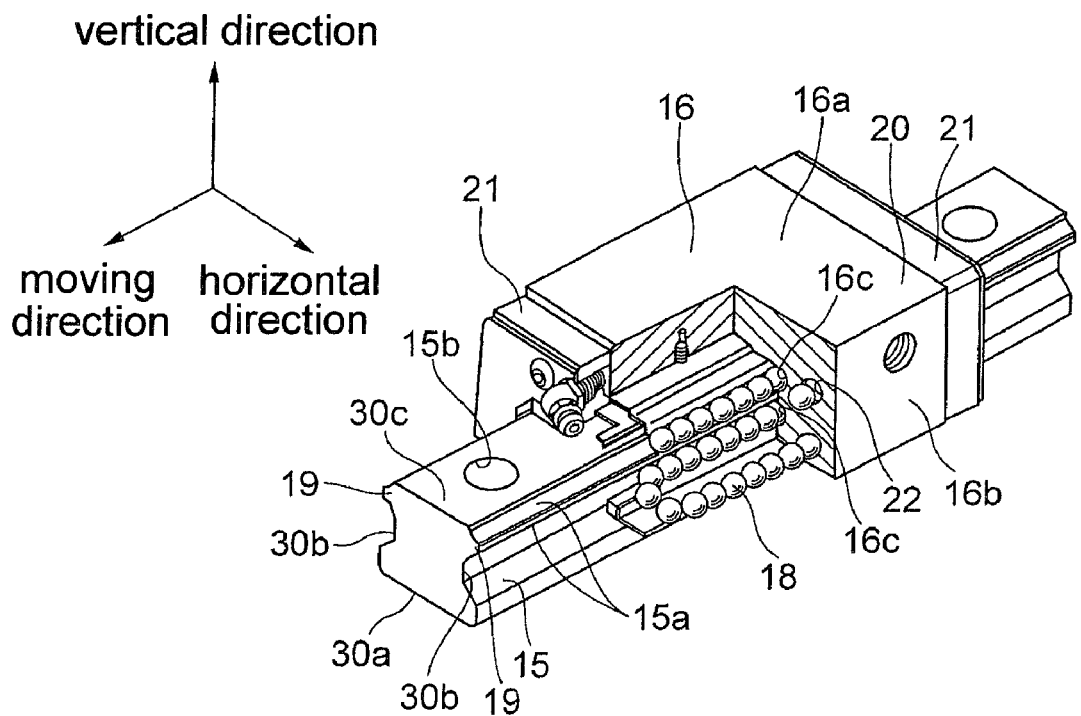
FIG. 4 is a perspective view of the motion guide device.

FIGS. 3 and 4 illustrate a motion guide device (13, 14) built in a relative motion system. FIG. 3 is a side view of the motion guide device (13, 14) and FIG. 4 is a perspective view thereof.

On the raceway rail 15, a saddle-shaped moving block 16 is mounted slidably. Between the raceway rail 15 and the moving block 16, a plurality of rolling elements 18 such as ball or rollers is placed rollably.

The raceway rail 15 elongates straightly. The raceway rail 15 has a bottom surface 30a, paired side surfaces 30b and an upper surface 30c and is formed to have an approximately quadrangular cross section. In the raceway rail 15, a mounting hole 15a is formed for mounting the raceway rail 15 on the moving body. On the upper parts of the side surfaces 30b of the raceway rail 15, there are formed raised threads 19. At upper and lower sides of each of the raised threads 19, two ball rolling grooves 15a are formed as rolling element rolling parts extending along the raceway rail 15. As the two raised threads 19 are formed at each side of the raceway rail 15, totally four ball rolling grooves 15a are formed. The four ball rolling grooves 15a are arranged in such a manner that the motion guide device bears loads equally in the vertical and horizontal directions on FIG. 4. With this arrangement, for example, the ratio of the rigidity in the vertical direction to the rigidity in the horizontal direction of the motion guide device itself (other than the displacement absorbing mechanism 17) becomes 1:1 to 1:3, approximately. Here, the number of threads of the ball rolling grooves 15a and arrangement are appropriately determined in accordance with required rigidities.

Each of the moving blocks 16 has a center portion 16a facing the upper surface 30c of the raceway rail 15, and side wall portions 16b extending downward from the both sides of the center portion 16a and facing the side surfaces 30b of the raceway rail 15. This moving block 16 has a steel-made moving block main body 20 and a pair of end plates 21 mounted on respective sides in the moving direction of the moving block main body 20.

The moving block main body 20 has loaded ball rolling grooves 16c as loaded rolling element rolling parts facing the respective ball rolling grooves 15a of the raceway rail 15. Corresponding to the ball rolling grooves 15a of the raceway rail 15, totally four loaded ball rolling grooves 16c are formed. In the moving block main body 20, a ball return path 22 is formed extending in parallel to and spaced a given distance from each loaded ball rolling groove 16c. End plates 21 made of resin attached to both ends of the moving block main body 20 have U-shaped direction change paths. Then, these loaded ball rolling groove 16c of the moving block 16, ball return path 22 and direction change paths consist in a circular ball circulation path (rolling element circulation path).

The ball circulation path has a plurality of balls 18 arranged therein. When the moving block 16 slides relative to the raceway rail 15, the plural balls 18 roll between the ball rolling groove 15a of the raceway rail 15 and the loaded ball rolling groove 16c of the moving block 16. Once each ball rolls from one end of the loaded ball rolling groove 16c up to the other end thereof, the ball 18 enters a direction change path of the end plate 21 and passes through the ball return path 22. After passing through the ball return path 22, the ball enters the direction change path of the opposite end plate 21 and returns back to the one end of the loaded ball rolling groove 16c. In this way, the balls 18 circulate in the ball circulation path.

FIG. 5 illustrate a motion guide device 13 provided with a displacement absorbing mechanism 17. The displacement absorbing mechanism 17 is attached as an attachment to between the side surface 23 of the moving block 16 and the base 12. Between the upper surface 24 of the moving block 16 and an inner wall surface 12a of the base 12, no displacement absorbing mechanism 17 is provided, and a space is given for the base 12 to be displaced relative to the moving block 16 in the vertical direction. The displacement absorbing mechanism 17 may be provided integral with the side surface 23 of the moving block 16.

Figure 6:
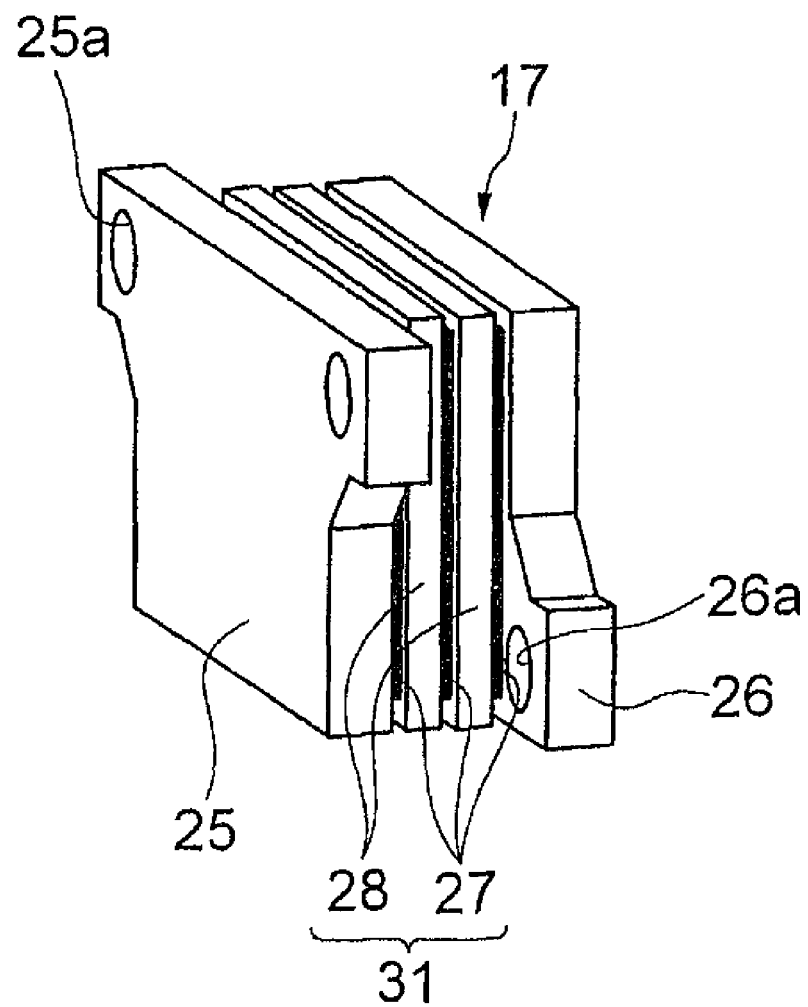
FIG. 6 is a perspective view of the displacement absorbing mechanism.

FIG. 6 illustrates a perspective view of a displacement absorbing mechanism 17. The displacement absorbing mechanism 17 is formed by stacking metal plates and rubber layers in parallel with the side surface 23 of the moving block 16. In other words, the displacement absorbing mechanism is comprised of a base plate 25 made of metal attached to the moving block 16, a mounting member 26 made of metal attached to the base 12 and a displacement absorbing portion 31 interposed between the base plate 25 and the mounting member 26. The displacement absorbing portion 31 may be made of one rubber layer or, like in this embodiment, formed by stacking a plurality of metal intermediate plates 28 and a plurality of rubber layers 27.

On the base plate 25, mounting holes 25a are formed for mounting onto the screw hole in the side surface 23 of the moving block 16. On the upper surface 24 of the moving block 16, no screw hole is formed. On the mounting member 26, a mounting hole 26a is formed for mounting onto a bracket 29 (see FIG. 5) suspending from the base 12. Adhesion between the base plate 25 and the mounting member 26, and rubber layer 27 is performed by adhesion using an adhesive agent or vulcanization adhesion carried out at the same time as rubber molding.

When the mounting member 26 is displaced in the direction crossing the upper surface 24 of the moving block 16, for example, in the vertical direction, shear stress acts on the displacement absorbing portion 31 and the displacement absorbing portion 31 is shear-deformed. This shear deformation of the displacement absorbing portion 31 allows displacement of the base 12 in the vertical direction relative to the moving block 16. In other words, displacement of the base 12 in the vertical direction relative to the moving body 11 can be absorbed. Hence, the motion guide device can be given a low rigidity in the vertical direction. Besides, when the base 12 is displaced in the horizontal direction relative to the moving block 16, compression stress or tensile stress is applied on the displacement absorbing portion 31 and the displacement absorbing portion 31 expands and contracts in the horizontal direction. As the displacement absorbing portion 31 is provided at each side surface 23 of the moving block 16, the cross sectional area of the displacement absorbing portion 31 can be enlarged and the motion guide device can be given a high rigidity in the horizontal direction. When the metal intermediate plate 28 is arranged, the horizontal-direction rigidity of the displacement absorbing mechanism 17 is further enhanced.

When the displacement absorbing mechanism 17 is provided, even if the moving block 16 is displaced in the vertical direction relative to the base 12, the load due to such displacement is not applied directly onto the inside of the moving block 16. For example, if the displacement absorbing mechanism 17 is not provided and the base 12 is displaced 0.5 mm, the load due to the displacement of 0.5 mm is applied to the inside of the moving block 16. On the other hand, when the displacement absorbing mechanism 17 is provided and the base 12 is displaced 0.5 mm, the displacement absorbing mechanism 17 absorbs the displacement of 0.5 mm, and no excess load is applied to the inside of the moving block 16. Accordingly, it becomes possible to elongate the life duration of rolling elements inside the moving block 16. As there is a space given on the upper surface 24 of the moving block 16, the base 12 is apt to be displaced in the vertical direction toward the upper surface 24 of the moving block 16.

Further, as the displacement absorbing mechanism 17 is made of stacked rubber layers that are susceptible to shear deformation, a ratio of the vertical-direction rigidity to the horizontal-direction rigidity can be set to less than 1 to 100, and they may be largely differentiated. Here, the term "rigidity" means a spring constant and is expressed in units of N/mm. The rigidity in the vertical direction is reduced in order to absorb displacement of the base 12 in the horizontal direction relative to the moving block 16. On the other hand, the rigidity in the horizontal direction is increased in order to prevent interference of, for example, coils and magnets of a linear motor moving while slightly spaced from each other when the moving body 11 is displaced in the horizontal direction. Two moving blocks 16 are mounted on the raceway rail 15 so as to increase the rigidity in the horizontal direction. Here, the rigidity in the vertical direction and the rigidity in the horizontal direction may be set appropriately depending on a structure of a relative motion system, a use environment and the like.

Figure 7A:
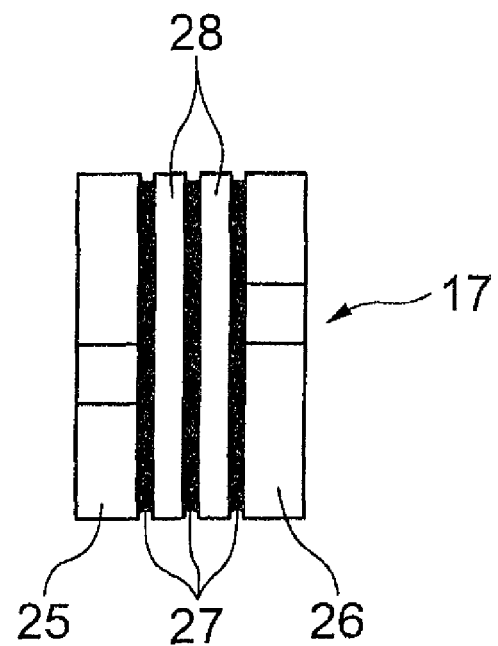
FIGS. 7(A) and 7(B) are views illustrating deformation of the displacement absorbing mechanism (FIG. 7(A) shows the displacement absorbing mechanism before being deformed and FIG. 7(B) shows the displacement absorbing mechanism being deformed)
Figure 7B:
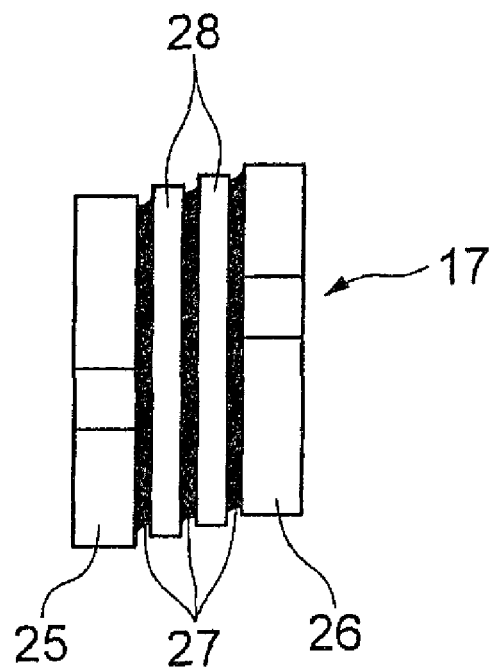

FIGS. 7(A) and 7(B) show deformation of the displacement absorbing mechanism 17. FIG. 7(A) shows the displacement absorbing mechanism 17 before being deformed and FIG. 7(B) shows the displacement absorbing mechanism 17 being deformed. As described above, the shear spring constant of the displacement absorbing mechanism 17 (spring constant when the mounting member 26 is displaced in the vertical direction relative to the base plate 25) is extremely smaller than or, for example, less than one hundredth of the compression spring constant (spring constant when the mounting member 26 is displaced in the horizontal direction relative to the base plate 25). Hence, the mounting member 26 can be easily displaced in the vertical direction relative to the base plate 25. If displacement of the mounting member 26 relative to the base plate 25 is made larger, the number of rubber layers may be increased. Target shear spring constant and compression spring constant can be obtained by adjusting factors including rubber hardness, thickness, area, layer number and the like.

If the shear spring constant and the compression spring constant are not much different from each other, the displacement absorbing mechanism may be formed by using, other than the stacking structure of the metal plates and rubber layers, a metal pin, an elastic member having slits formed therein such as a cup ring, or a coil spring. However, the metal pin may be subjected to buckling and the elastic member having slits may cause stress concentration on a thin portion.

Figure 8:
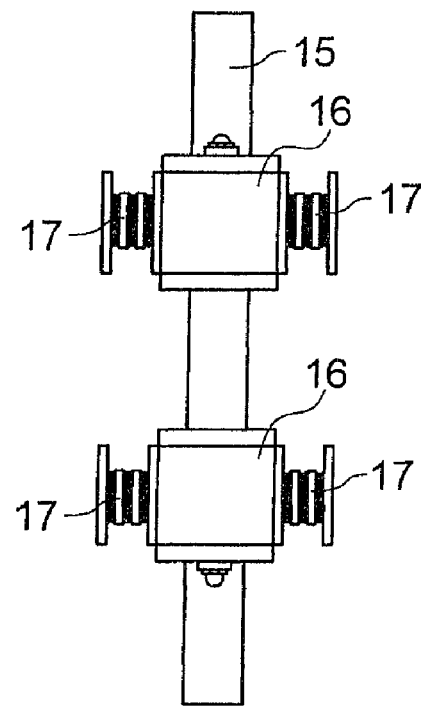
FIG. 8 a plane view of the motion guide device having the displacement absorbing mechanism mounted thereon.
Figure 9:
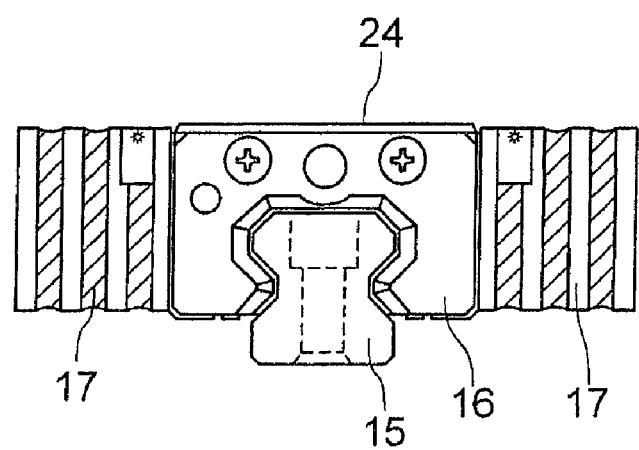
FIG. 9 a front view of the motion guide device having the displacement absorbing mechanism mounted thereon.

As shown in FIGS. 8 and 9, the displacement absorbing mechanism 17 is attached to each of side surfaces of the moving block 16. Space over the upper surface 24 of the moving block 16 is controlled by connecting the displacement absorbing mechanism 17 to the base 12 while a shim is interposed between the upper surface 24 of the moving block 16 and the base 12 and then removing the shim therefrom. The size of the space over the upper surface 24 of the moving block 16 is set to be larger than an amount of displacement of the base 12 in the vertical direction relative to the moving block 16.

Figure 10:
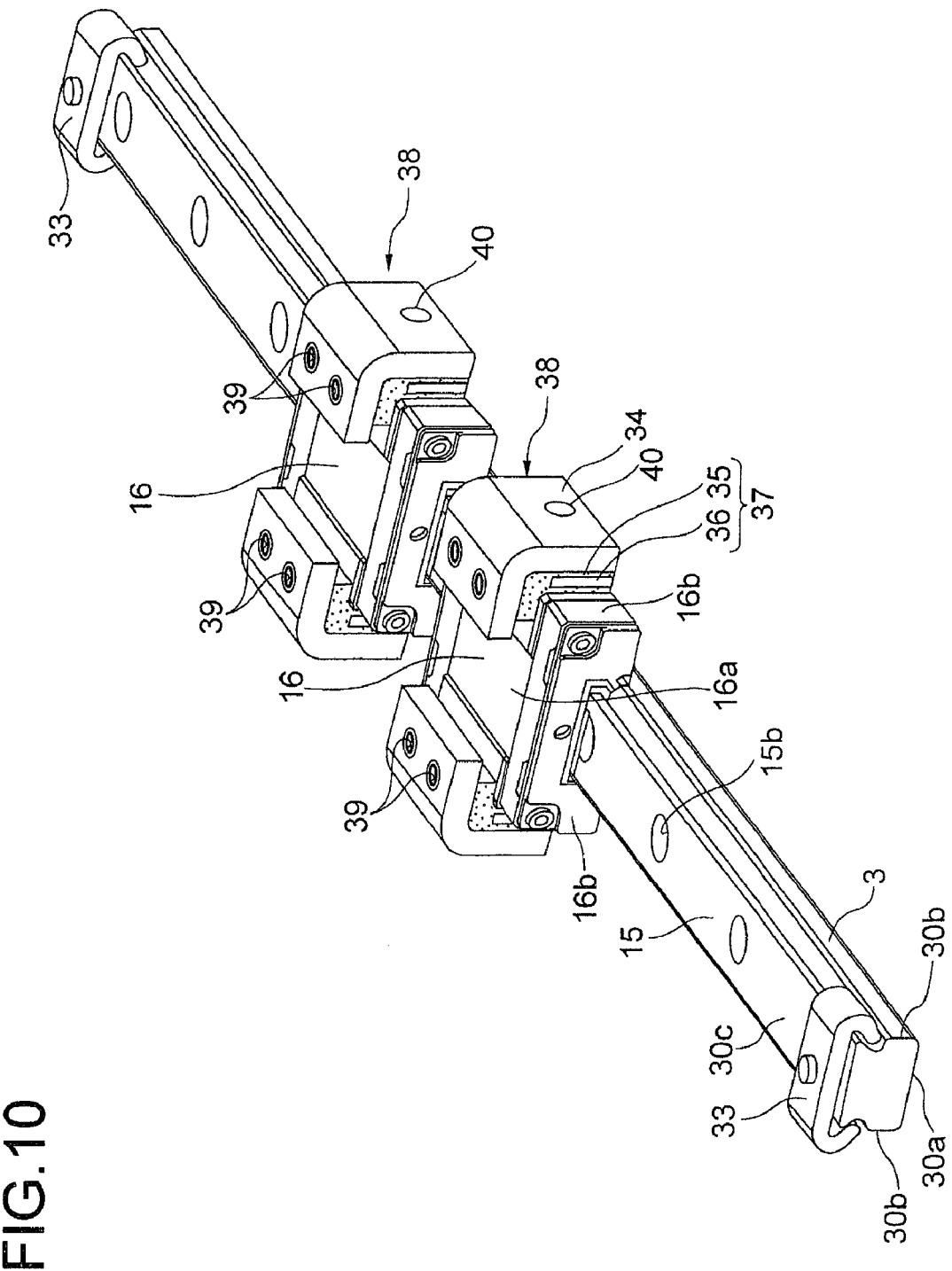
FIG. 10 a perspective view of a motion guide device according to a second embodiment of the present invention.
Figure 11:
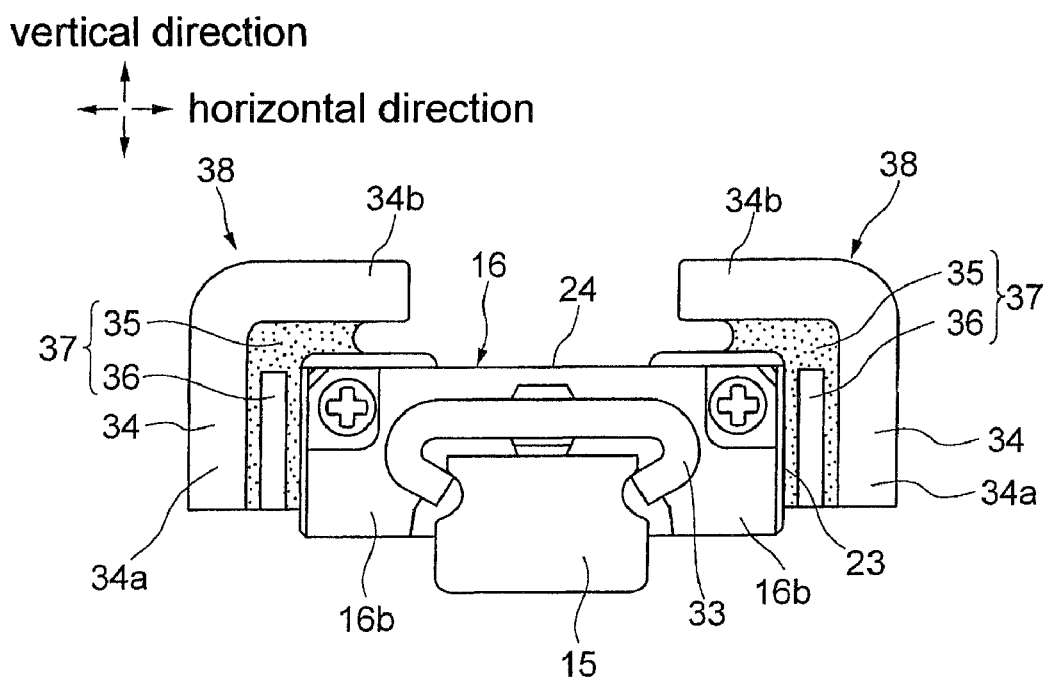
FIG. 11 a front view of the motion guide device of FIG. 10.
Figure 12:
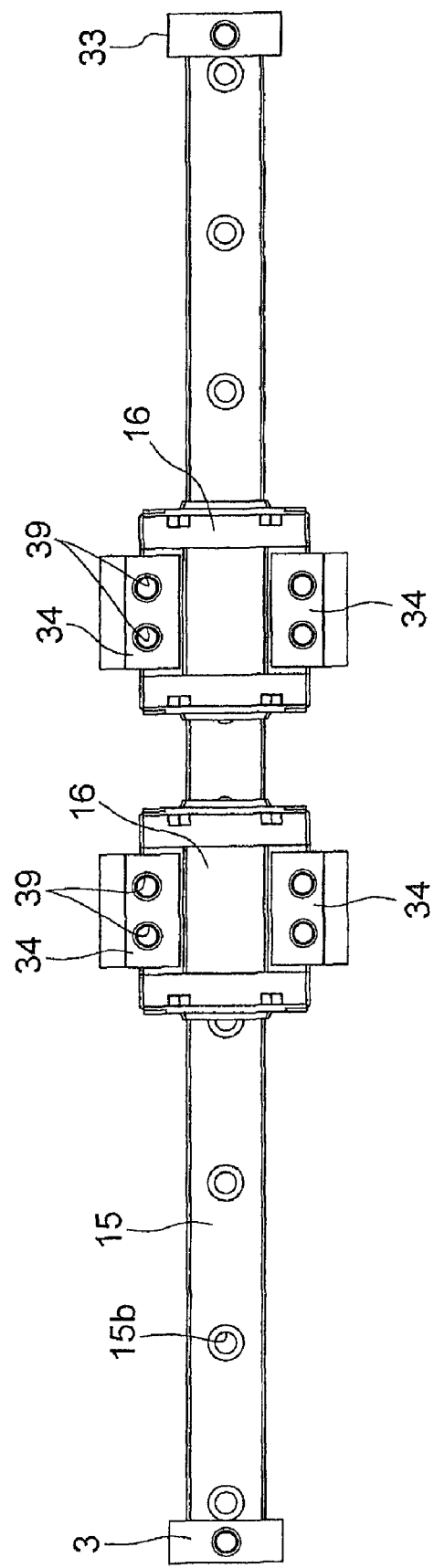
FIG. 12 a plane view of the motion guide device of FIG. 10.
Figure 13:
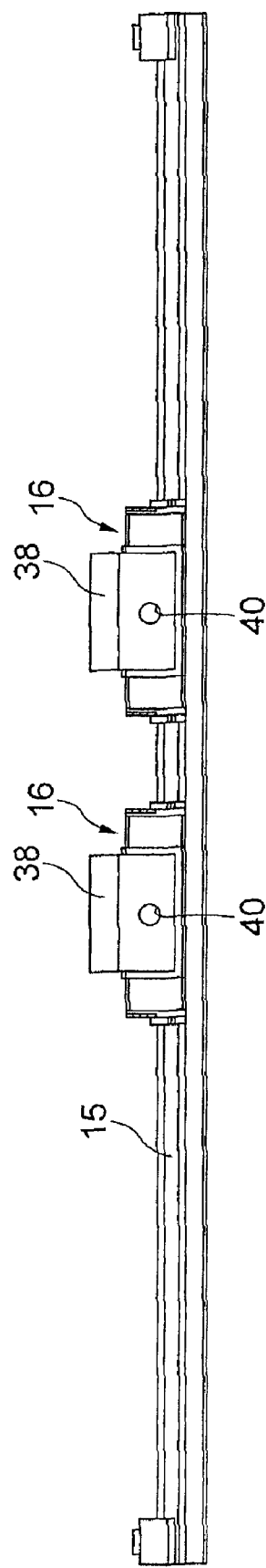
FIG. 13 a side view of the motion guide device of FIG. 10.

FIGS. 10 to 13 illustrate a motion guide device according to a second embodiment of the present invention. FIG. 10 is a perspective view of the motion guide device, FIG. 11 is a front view thereof, FIG. 12 is a plane view thereof and FIG. 13 is a side view thereof.

The motion guide device according to the second embodiment also exhibits a high rigidity in the horizontal direction and a low rigidity in the vertical direction, like that of the first embodiment. However, the motion guide device of the second embodiment is different from that of the first embodiment in that, in the motion guide device of the second embodiment, the horizontal width of the motion guide device is designed to be reduced and the rigidity in the vertical direction is designed to be higher and closer to the rigidity in the horizontal direction.

The motion guide device has a raceway rail 15 having a bottom surface 30a, side surfaces 30b and an upper surface 30c and moving blocks 16 each having a center portion 16a facing the upper surface 30c of the raceway rail 15 and side wall portions 16b facing the side surfaces 30b of the raceway rail 15. As the structures of the raceway rail 15 and the moving blocks 16 are the same as those of the motion guide device of the first embodiment, they are designated by like numerals and explanation thereof is omitted. At each axial end of the raceway rail 15, a stopper 33 is provided to limit stroke of the moving block 16.

At each side surface 23 of each moving block 16, a displacement absorbing mechanism 38 is provided. As shown in FIG. 11, the displacement absorbing mechanism 38 has a mounting member 34 attached to the base 12 and a displacement absorbing portion 37 interposed between the side surface 23 of the moving block 16 and the mounting member 34. The displacement absorbing portion 37 is a rubber stacking structure formed by stacking a metal plate 36 in parallel with the side surface 23 of the moving block 16 and a rubber layer 35 such as NC rubber. The rubber layer 35 is vulcanization-adhered to the side surface 23 of the moving block 16 and the mounting member 34. This rubber layer 35 extends from the side surface 23 of the moving block 16 up to a part of the upper surface 24 of the moving block 16.

The mounting member 34 has a mounting-member side wall portion 34a facing the side surface 23 of the moving block 16 and a mounting-member upper wall portion 34b facing the upper surface of the moving block 16. The mounting member 34 is formed having an L-shaped cross section. The mounting member 34 is divided into two corresponding to the horizontally-paired side wall portions 16b of the moving block 16. The mounting-member upper wall portion 34b of the mounting member 34 is provided with mounting holes 39 (see FIG. 12) for mounting onto the base 12. Each mounting hole 39 is formed to have a female thread. On the upper surface 24 of the moving block 16, there is no mounting hole formed for mounting onto the base 12.

Figure 14:
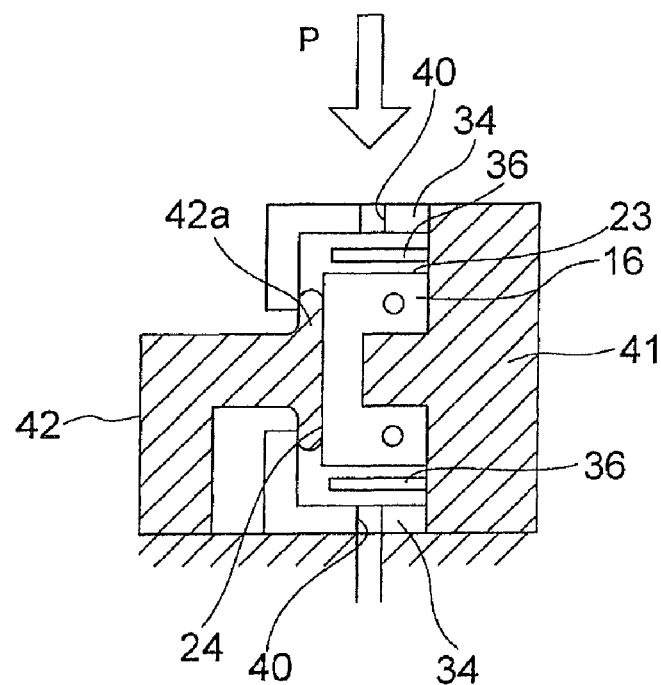
FIG. 14 a view showing a vulcanization-adhesion method.

FIG. 14 shows an example of a method of vulcanization-adhering rubber to the side surface 23 of the moving block 16. Each side surface 23 of the moving block 16 is coated with an adhesive agent and the moving block 16 is then arranged in molds 41 and 42. The mold 41 is brought into contact with the inner wall surface of the moving block 16 and the mold 42 is brought into contact with the upper surface 24 of the moving block 16. This is followed by coating the inner side of the mounting member 34 with an adhesive agent and arranging a mounting member 34 to each side of the moving block 16. Between the side surface 23 of the moving block 16 and the mounting member 34, a metal plate 36 is placed from each longitudinal end. The metal plate 36 is supported at both longitudinal ends.

Next, rubber compound is inserted through an inlet 40 of the mounting member 34. The rubber compound extends from the side surface 23 of the moving block 16 to around the metal plate 36, further to the upper surface 24 of the moving block 16. Then, pressure P is applied between the side surface 23 of the moving block 16 and the mounting member 34 and the temperature is raised. In a given time period, the rubber is subjected to press vulcanization and the rubber layer 35 is vulcanization-adhered to the side surface 23 of the moving block 16 and the mounting member 34.

Figure 15:
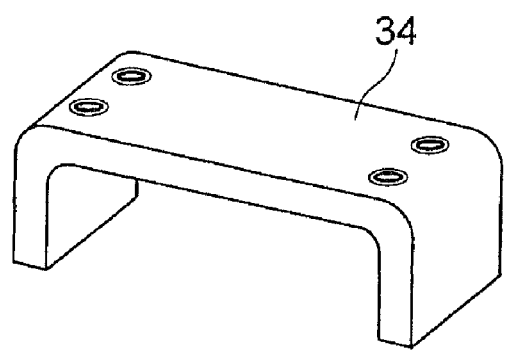
FIG. 15 a perspective view illustrating another example of the mounting member.
Figure 16:
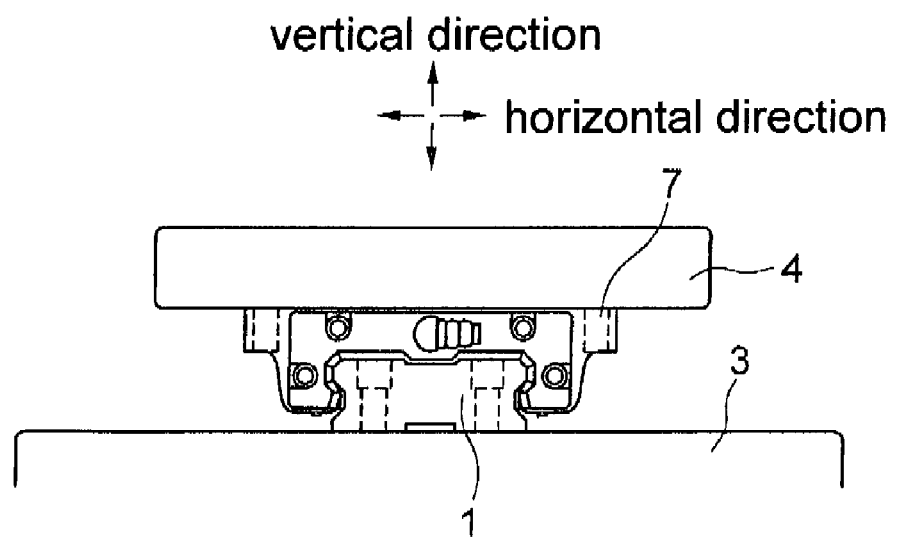
FIG. 16 a view illustrating a conventional example of a motion guide device used as a one-axis device.
Figure 17:
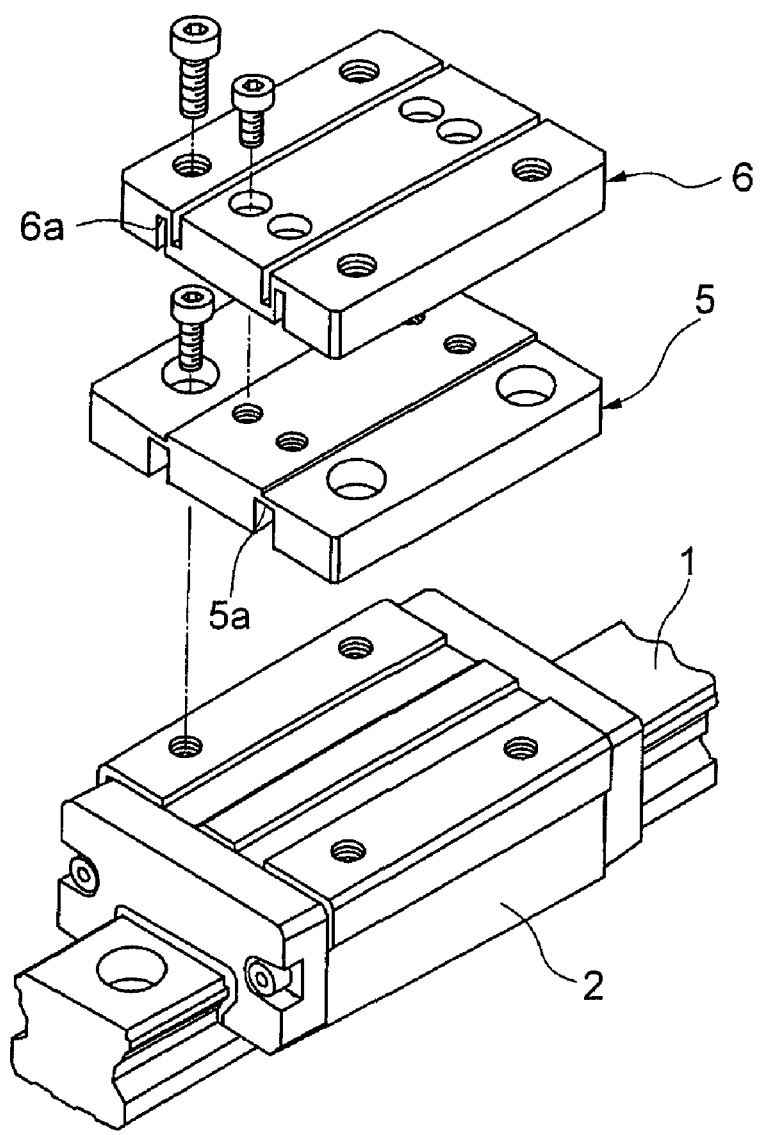
FIG. 17 a perspective view illustrating a conventional displacement absorbing mechanism.

Here, as illustrated in FIG. 15, the mounting member 34 may be formed like a gate-shaped casing covering the side surfaces 23 and the upper surface 24 of the moving block 16. However, vulcanization-adhesion of the rubber requires pressure to be applied to the rubber compound. If the mounting member 34 is formed like a gate-shaped casing, it becomes difficult to apply pressure to the rubber compound inserted between the side surface 23 of the moving block 16 and the mounting member 34 even when the pressure P is applied. Therefore, the mounting member 34 is required to be divided into two.

If the metal plate 36 is arranged to the side of the moving block 16 and the rubber is made to extend from the side surface 23 to a part of the upper surface 24 of the moving block 16, the rubber to the upper surface side of the moving block 16 has a single-layer rubber structure, while the rubber to the side surface side of the moving block 16 has a two-layer rubber structure with the metal plate 36 interposed therebetween.

After the rubber is molded, the vulcanization-adhered moving block 16 is slid to be drawn from the molds 41 and 42. If the tip end 42a of the mold 42 in contact with the upper surface 24 of the moving block 16 enters the inside of the mounting member 34 in such a manner as to be in contact with the whole upper surface 24 of the moving block 16, it becomes difficult to draw the moving block 16 from the molds 41 and 42. For this reason, in this embodiment, the rubber is molded to extend to the upper surface 24 of the moving block 16 while the tip end 42a of the mold 42 is kept away from covering the whole upper surface 24 of the moving block 16. Here, if the moving block 16 is drawn from the molds 41 and 42 and the rigidity in the vertical direction of the motion guide device is reduced further, the rubber is prevented from extending to the upper surface 24 of the moving block 16 and the tip end 42a of the mold 42 is placed to cover the whole upper surface 24 of the moving block 16.

When the rubber layer 35 is vulcanization-adhered to the side surface 23 of the moving block 16, the moving block 16 serves as the base plate 25 (see FIG. 6) of the displacement absorbing mechanism 17 of the first embodiment, and this eliminates the need to provide the base plate 25. Besides, as the mounting member 34 is L-shaped and mounting holes 39 are formed on the mounting-member upper wall portion 34b to the upper surface side of the moving block 16, the mounting-member side wall portion 34a need not be thicker, and the bracket 29 (see FIG. 5) like in the displacement absorbing mechanism 17 of the first embodiment can be omitted here. Therefore, it is possible to reduce the horizontal width of the motion guide device.

Further, as the lamination-type and single-layer rubber structures are easily obtained, the rigidity can be freely set both in the horizontal and vertical directions. For example, if the rubber structure is of single layer to the upper surface side of the moving block 16 and of two layers with a metal plate 36 interposed therebetween to the side surface side of the moving block 16, a ratio of the vertical-direction rigidity to the horizontal-direction rigidity can be set approximately to 1:10 to 20. As a part of the upper surface 24 of the moving block 16 is not provided with the rubber layer 35 (space is provided), the base 12 is easily displaced toward the moving block 16.

The rigidity of the motion guide device depends on the thickness of the rubber layer 35, an area of the rubber layer 35, and presence or absence of the metal plate 36. These are determined appropriately in accordance with the specifications of the motion guide device. For example, if the rigidity in the vertical direction is further increased, the metal plate 36 may be interposed between the upper surface 24 and the mounting member 34, or the rubber layer 35 is molded to extend over a broader area of the upper surface 24 of the moving block 16. When the rigidity in the vertical direction is decreased further, the rubber layer 35 only has to be prevented from extending over the upper surface 24 of the moving block 16. When the rigidity in the horizontal direction is further increased, metal plates 36 are increased in number, such as two or three metal plates, and they may be placed to the side surface side of the moving block 16. When the rigidity in the horizontal direction is further decreased, the metal plate 36 is removed and a rubber layer 35 of single layer structure may only be used.

The present invention is not limited to the above-described embodiments and may be embodied in various forms without departing from the scope of the present invention. For example, in the above-described embodiments, the raceway rail of the motion guide device is mounted on the moving body and the moving block is mounted on the fixed base. However, the raceway rail may be mounted on the base and the moving block may be mounted on the moving body. Further, the motion guide device of the present invention is not limited to the relative motion system of the above-described embodiments and may be built in various relative motion systems that need displacement absorbing mechanism. Further, the displacement absorbing mechanism may be provided not for absorbing displacement due to thermal expansion/thermal contraction but for absorbing displacement due to attachment error or processing error.

The raceway rail is not limited to a raceway rail having a quadrangular cross section and may be a raceway rail having an I-shaped cross section as long as the raceway rail has a bottom surface, side surfaces and an upper surface. The raceway rail does not have to extend straight but may be curved. The present invention is applicable to a slide-type motion guide device having no rolling element placed between the raceway rail and the moving block and also to a limited-stroke type motion guide device in which rolling elements are unable to circulate.

The present specification is based on Japanese Patent Application No. 2005-323526 filed on Nov. 8, 2005, the entire contents of which are expressly incorporated by reference herein.

The invention claimed is:

1. A motion guide device for guiding linear or curvilinear motion of a moving body relative to a base, comprising:
    a raceway rail having a bottom surface, side surfaces and an upper surface and being mounted on one of the base and the moving body;
    a moving block having a center portion facing the upper surface of the raceway rail and side wall portions facing the side surfaces of the raceway rail and being mounted linearly or curvilinearly movable relative to the raceway rail; and
    a displacement absorbing mechanism provided on a side surface of the moving block,
    wherein the moving block has rolling elements adapted to roll within at least one rolling-element rolling part on said raceway rail, said at least one rolling-element rolling part extending parallel to a direction of the linear or curvilinear motion of the moving body, and
    the displacement absorbing mechanism has a mounting member mounted on an opposite one of the base and the moving body, and a displacement absorbing portion which is fixed to the mounting member and which is shear-deformed when the mounting member is displaced in a direction crossing an upper surface of the moving block due to a load between the moving body and the base through the moving block, the mounting member has a mounting-member side wall portion facing the side surface of the moving block and a mounting-member upper wall portion facing the upper surface of the moving block, and the mounting-member upper wall portion of the mounting member is provided with a mounting hole for mounting the mounting-member onto the opposite one of the base and the moving body.

2. The motion guide device according to claim 1, wherein the displacement absorbing portion has a rubber layer interposed between the side surface of the moving block and the mounting-member side wall portion, and the rubber layer also extends between the upper surface of the moving block and the mounting member upper wall portion.

3. The motion guide device according to claim 2, wherein said displacement absorbing mechanism has a vertical rigidity to a horizontal rigidity of 1:10 or less.

4. The motion guide device according to claim 2, wherein said displacement absorbing mechanism provides a lower rigidity in a vertical direction perpendicular to a top face of said raceway rail than in a horizontal direction widthwise across the top face of said raceway rail.

5. The motion guide device according to claim 1 or 2, wherein the mounting-member is divided into two pieces so as to correspond to the side wall portions of the moving block.

6. The motion guide device according to claim 5, wherein said displacement absorbing mechanism has a vertical rigidity to a horizontal rigidity of 1:10 or less.

7. A relative motion system, having a motion guide device according to claim 5, and the base and the moving body linearly or curvilinearly movable relative to the base, comprising:

the moving body having a wall surface;

the base having a wall surface facing the wall surface of the moving body;

the motion guide device being provided between the wall surface of the moving body and the wall surface of the base; and a driving source for the linear or curvilinear motion of the moving body relative to the base.

8. A relative motion system, having a motion guide device according to claim 1 or 2, and the base and the moving body linearly or curvilinearly movable relative to the base, comprising:

the moving body having a wall surface;

the base having a wall surface facing the wall surface of the moving body;

the motion guide device being provided between the wall surface of the moving body and the wall surface of the base; and a driving source for the linear or curvilinear motion of the moving body relative to the base.

9. The relative motion system according to claim 8, wherein said displacement absorbing mechanism has a vertical rigidity to a horizontal rigidity of 1:10 or less.

10. The motion guide device according to claim 1, wherein said displacement absorbing mechanism has a vertical rigidity to a horizontal rigidity of 1:10 or less.

11. The motion guide device according to claim 1, wherein said displacement absorbing mechanism provides a lower rigidity in a vertical direction perpendicular to a top face of said raceway rail than in a horizontal direction widthwise across the top face of said raceway rail.

* * * * *